Jan. 17, 1956  N. A. MARSHALL ET AL  2,731,559
ELECTRONIC MEASURING DEVICE
Filed July 11, 1952
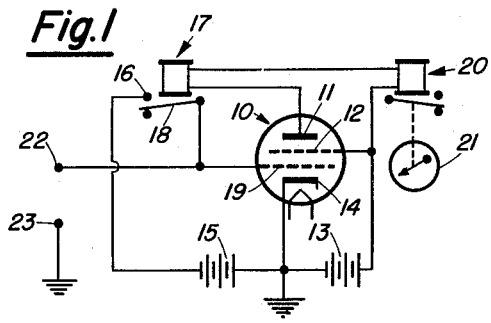
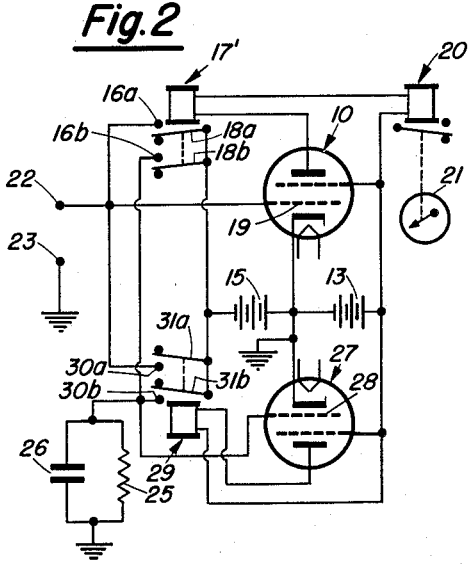
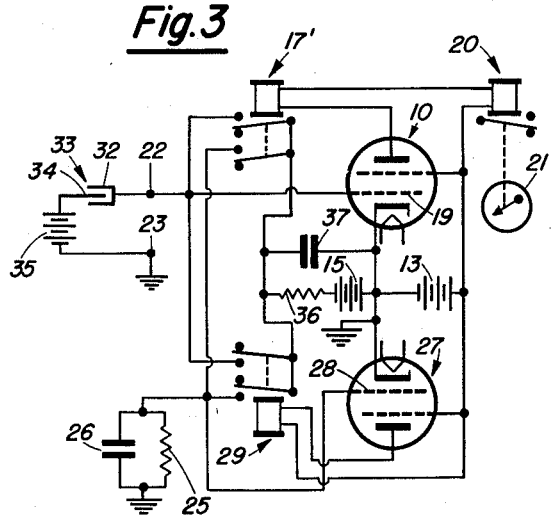
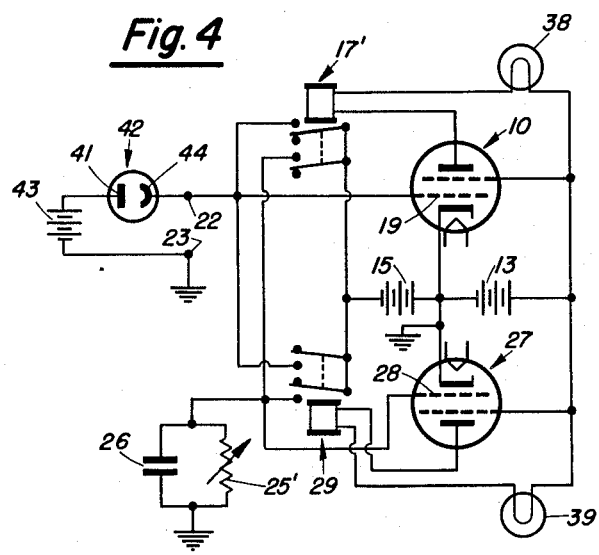
INVENTOR.
Neil A. Marshall
Jason A. Adler
BY
Attorneys

United States Patent Office 2,731,559
Patented Jan. 17, 1956

2,731,559

ELECTRONIC MEASURING DEVICE

Neil A. Marshall, San Francisco, and Jason A. Adler, Beverly Hills, Calif., assignors to the United States of America as represented by the Secretary of the Navy Application July 11, 1952, Serial No. 298,478

3 Claims. (Cl. 250—27)

(Granted under Title 35, U. S. Code (1952), sec. 266)

The present invention relates to electronic indicating and measuring devices and more particularly to a device adapted to measure indirectly physical factors such as temperature, humidity, pressure, radiation and the like or indicate when the magnitude of the factors arrives at a certain value through the influence of the factors upon particular electronic circuits.

Some electronic circuits are specifically designed to respond to a given physical factor, an example being the photoelectric circuit. Frequently an electronic circuit of this type can be constructed as a two-terminal network such that after it has been, so to speak, charged up by the application from an external source of a voltage between its terminals and the external source has then been removed, the voltage between its terminals will reduce toward zero at a rate determined by the magnitude of the given physical factor. Assuming that the particular components of the network are known so that the equation of voltage versus time discharge curve of the network is known, it will be convenient to define, by analogy to the case in electrostatics of a condenser discharging through a resistance, the "time constant" of the two-terminal network as being the time required for the voltage across its terminals to reduce to a definite fraction, $1/e$, of its original value, where $e$ is the natural base of logarithms. This "time constant" can then also be said to be determined by the magnitude of the physical factor.

It is an object of the present invention to provide an electronic measuring device adapted to indicate when the time constant, hereinbefore defined, of a network of the described type falls short of a predetermined value so as to provide an indirect indication that the magnitude of a physical factor that determines the time constant has reached a predetermined value. It is another object of the present invention to provide an electronic measuring device adapted to measure indirectly the magnitude of a physical factor that determines the time constant.

Essentially the electronic device of the present invention comprises, when suitably connected to an exterior circuit, the arrival of whose voltage at a predetermined value is to be detected or the time constant of which is to be measured, a recycling oscillator whose frequency is, under certain circumstances, determined by that time constant. The recycling oscillator includes a tube arranged upon flow of current through its plate circuit to connect a bias voltage source to its control grid so as to apply momentarily to the grid a negative potential of such value as to bias the tube beyond cut-off and thereafter to disconnect the bias voltage source. The exterior network or circuit which is to be tested is suitably connected to the grid of the oscillator tube so as to be simultaneously "charged up" when the grid receives its application of potential. The respective circuit components in the exterior network and in the grid circuit within the tube in the electronic device are so relatively proportioned that it is substantially the exterior circuit alone which controls or determines the grid potential after the bias voltage source has been disconnected. After disconnection of the voltage bias source, the potential at the grid is allowed to rise above cut-off, the way the potential rises being determined, then, by the exterior network, that is by the magnitudes of the circuit elements in the network. The time required for the grid voltage to rise above the cut-off value of the oscillator tube and thus permit the tube to conduct can be gaged, it is seen, from the time constant of the network or exterior circuit under test. Since the tube, upon conducting, again establishes a negative bias on the grid, cutting off the flow of plate current, the device is seen to be a recycling arrangement. An indicator, such as a counter, is included to indicate each time the tube conducts. When the recycling occurs at a constant rate during any convenient time interval, it is meaningful to speak of the frequency of conducting of the oscillator tube. This oscillating frequency, which is revealed by the rate at which the indicator is counting, is a function of and hence a measure of the time constant of the exterior network being tested and therefore is also a measure of the magnitude of the physical factor that determines the time constant, that is, the physical factor to which the exterior network responds.

In addition to the basic indicating circuit, as generally described above, the invention contemplates an arrangement in which a discriminating circuit, generally similar in construction to the basic circuit, is connected in parallel with the basic indicating circuit and includes a resistor and a capacitor of pre-selected values in the grid circuit portion thereof, such that only a time constant in the network to be tested that is below a predetermined value will be permitted to actuate the counter in the basic indicating circuit. The invention further contemplates varying the magnitudes of the circuit elements in the discriminating circuit to vary the predetermined value of the exterior network time constant required for actuation of the counter, and if that time constant remains invariable for a convenient interval of time the discriminating circuit can be adjusted during that time to the point of just permitting actuation of the counter. At this point the device can be said to be measuring the time constant of the exterior network, and hence the magnitude of the variable that controls the time constant. The actual magnitude of that time constant or variable can be obtained by calibration in appropriate units of the variable circuit elements in the discriminating circuit.

Explanatory details of the arrangement of the present invention, as well as further objects and advantages thereof, will become better understood by reference to the following detailed description when considered in connection with the accompanying drawings wherein:

Fig. 1 is a diagram of the basic circuit of the electronic device of the present invention;

Fig. 2 is a circuit diagram similar to that shown in Fig. 1, but with the addition of a discriminating circuit in accordance with the present invention;

Fig. 3 shows a circuit diagram of the electronic circuit of Fig. 2 as applied to the detection of a predetermined level gamma radiation; and Fig. 4 is a diagram similar to Fig. 3, but applied to measurement of the intensity of light impinging on a photo-tube.

As shown in Fig. 1, the device includes a tube 10, conveniently a tetrode, whose plate 11 and screen grid 12 are connected to a suitable source of positive potential, illustrated as a battery 13. The cathode 14 of the tube 10 is connected to the negative side of the battery 13, which is at ground potential. A second battery 15 is connected between the cathode 14 and one contact 16 of a relay 17 having normally open contacts. The other contact 18 of the relay 17 is directly connected to the control grid 19 of the tube 10. The coil of the relay is in the plate circuit of the tube 10 so that current flow in the plate circuit will close the relay contacts to apply the negative potential of the battery 15 to the control grid 19 of the tube. The voltage thus applied is of such value as to bias the grid 19 of the tube well beyond cut-off potential for the existing plate voltage. The flow of plate current also actuates a second relay 20 in the plate circuit, which relay is connected to a mechanical counter 21.

The exterior circuit to be tested is connected between suitable terminals 22 and 23 so that the bias voltage is simultaneously established across this circuit when the grid is connected to battery 15. As hereinbefore suggested, the magnitudes of the respective circuit elements in the exterior circuit and in the circuit of grid 19 must be so proportioned that when the contacts of relay 17 are opened the exterior circuit to be tested determines the potential of the grid.

Operation

Upon initial application of power to the circuit (i. e., connection of the batteries 13 and 15, as shown), no bias exists on the grid 19, and the tube 10 therefore conducts to close the contacts of the relay 17 and consequently apply the bias voltage to the grid 19 and stop conduction of the tube 10. Upon this cutting off of the plate current, the relay contacts then open leaving the grid 19 with a negative potential. Thereafter the potential difference across the exterior circuit reduces in accordance with its time constant thus reducing the negative potential on the grid until it rises above cut-off and the tube 10 thereupon again conducts. The cycle is then repeated, the grid potential being driven beyond cut-off by battery 15 and thereafter again permitting conduction when the potential difference across the exterior circuit reduces and the negative grid potential rises above cut-off. The length of time required for the grid potential to rise above cut-off after once being driven below cut-off by the potential of battery 15 is thus seen to depend on the time constant of the exterior circuit. If during a convenient interval of time the cycle repeats at a constant or regular rate then it is possible to speak of the frequency of conduction of the tube or the oscillating frequency of the circuit and this frequency can then be said to be a measure of the time constant of the exterior circuit or of any particular physical factor that determines that time constant.

Each time the tube conducts, the counter 21 records the event. Each time the counter clicks it means that the physical factor that determines the change of potential across the exterior circuit has reached such a value that the grid potential has been caused to rise above cut-off. For the case when the counts occur at a regular spacing for a given time interval, the number of counts per unit time will provide a measure of the time constant of the exterior circuit and hence of the magnitude of the physical factor that determines the time constant and these can be measured directly on a counting-rate meter substituted for the counter 21 and calibrated in the proper units.

From the foregoing explanation it is apparent that if, after the charging step of the cycle (connection of battery 15 to grid 19) has been accomplished and the potential difference across the exterior network has started to decrease, an independent means is caused to recharge the grid and exterior network to beyond cut-off potential (without flow through the plate circuit of tube 10) before the potential difference across the exterior network has decreased sufficiently to raise the grid potential above cut-off, then, in effect, a new cycle has been started without any registration on the counter 24. Further, if this independent grid-charging means is caused to operate cyclically at a rate greater than that at which the exterior circuit attempts to cycle, then the counter 24 will not register at all. This suggests the possibility of the addition to the aforedescribed circuit of a discrimination circuit arranged to preclude the actuation of the counter 21 (i. e. to preclude conduction of tube 10) when the time constant of the exterior network under test is longer than a predetermined interval. Thus, if a discrimination circuit is provided with timing means preset to periodically independently drive the control grid of tube 10 beyond cut-off at a predetermined rate, the basic indicating circuit will then discriminate against or refrain from counting any cycle that would tend to occur in the basic indicating circuit in an interval longer than the cycling interval of the predetermined, independent, timed circuit. Consequently, it can be said that the counter 21 would refrain from indicating or would discriminate against any cycling that would tend to occur in the indicating circuit as a result of events in the exterior circuit unless the rate of that cycling would exceed the cycling rate of the independent grid-charging circuit. Also, therefore, it can be said that counter 21 will not record unless the physical factor controlling the would-be cycling rate in the exterior network achieves a certain value.

A typical and convenient electrical timing means is a self-cycling R—C circuit in which a condenser charged up to a certain potential is caused to discharge through a resistance down to any particular value of potential and thereupon actuates means to recharge itself to starting potential. Since in such an arrangement the potential difference across the condenser always reduces to any particular value in the same time interval, which is predetermined by the magnitudes of R and C, this characteristic can be used to cause the R—C circuit to actuate, upon the elapse of each such time interval, a device connected to the R—C circuit and responsive to the particular value of potential difference. This type of timing means, embodied in what may be termed a recycling oscillator circuit, is shown in Fig. 2 placed in parallel with the basic indicating circuit as shown in Fig. 1. A resistor 25 and a capacitor 26 are placed in parallel with each other in the grid circuit of a tube 27, which can be like the tetrode 10 and is otherwise electrically connected in a manner similar to the tube 10. The coil of the relay 17' in the plate circuit of the tube 10 is arranged to actuate ganged contacts 18a, 18b to connect the negative side of the bias battery 15 to the grids 19 and 28 of tubes 10 and 27 through contacts 16a and 16b, respectively. A relay 29 with its coil in the plate circuit of the tube 27 is similarly arranged to actuate ganged contacts 31a, 31b to also connect the negative side of the bias battery 15 to the grids 19 and 28 of tubes 10 and 27, in this case through contacts 30a and 30b, respectively. Consequently, conduction of either tube 10 or tube 27 will cause bias voltage to be applied to the grids 19 and 28 of both tubes.

With the indicating and discriminating circuits in parallel as described, only that tube will conduct whose grid voltage first rises above cut-off after both tubes have been driven beyond cut-off. If, in the arrangement shown, the cut-off voltage is the same for both tubes and if the exterior network to be tested, connected between terminals 22 and 23, is also an R—C circuit, then it can be said that if the time constant of the R—C circuit connected to grid 28 of the tube 27 is smaller than the time constant of the network under test, the potential on the grid 28 will rise above cut-off sooner than that on the grid 19 would tend to rise above cut-off and the discriminator tube 27 will conduct and subsequently reestablish the negative potential of battery 15 on the grids of both tubes 10 and 27 through actuation of relay 29 before tube 10 would become conducting. Only when the magnitude of the physical factor that determines the time constant of the network under test changes to such a value that the time constant of the exterior network is made smaller than that of R—C circuit of the grid 28, of the discriminator 27 will the indicating tube 10 conduct and cause the counter 21 to indicate an event.

An illustrative example of the use of the present invention is shown in Fig. 3 wherein the device of the present invention is applied to the detection of gamma radiation. The cathode 32 of an ionization chamber 33 is connected to the grid 19 of the tube 10 and the collecting anode 34 of the chamber is connected to a suitable source of low voltage, such as battery 35. When gamma rays from a selected source enter the ionization chamber, electrons flow to the anode 34 and positive ions are attracted to the cathode 32.

As seen by the grid 19, the ionization chamber circuit across the terminals 22, 23 appears as an R-C circuit, the R of which becomes smaller in magnitude the greater the ion flow. With the circuit elements so proportioned that the resistance of the tube 19 is always much larger than the effective resistance of the ionization chamber and the grid capacitance is always much smaller than the capacitance of the ionization chamber, the ionization chamber will then substantially exclusively determine the potential on the grid 19, and the time constant of the chamber, which is in effect the time constant of the combined circuit, will thus be determined by the radiation level.

However, background radiation, such as cosmic rays, will also cause positive ions to arrive at the cathode 32 of said chamber and will therefore also affect the rate of voltage change on the grid 19 of the tube 10. To enable discrimination against such background radiation, it has been conventional practice to employ a second ionization chamber arranged to counteract the effect of such radiation and accordingly provide for determination of the amount of the gamma radiation only when rays emanate from the source whose activity is desired to be known.

By the use of the discriminating circuit constructed in accordance with the present invention, discrimination against background radiation is achieved in a simple and inexpensive manner which permits of facile adjustment in accordance with any change in the background radiation level. Thus, it is merely necessary to insert a resistor 25 and capacitor 26 of such value in the grid circuit of the discriminator tube 27 as to provide for a time constant just smaller than that of the circuit of grid 19 of the tube 10 when the ionization chamber 33 is exposed to background radiation alone so that only the discriminator tube 27 will conduct. When, subsequently, the chamber 33 is exposed to the gamma radiation source, the time constant of the circuit of the grid 19 of the tube 10 will become smaller than that of the grid of the discriminator tube 27 so that the former tube will conduct instead of the latter. The counter 21 will thus indicate only when the radiation level exceeds a predetermined value. The number of counts recorded in a given time interval by the mechanical counter 21 associated with the plate circuit of the measuring tube 10 will thus provide a measure of the amount of gamma radiation only when the device is exposed to the particular radiation source under consideration.

A further refinement of the circuit for measuring gamma radiation also appears in Fig. 3. Since the response of an ionization chamber operating with a relatively low collecting voltage is known to drop off as the amount of gamma radiation increases, an arrangement can be introduced into the measuring circuit to compensate for such non-linear response of the ionization chamber. The non-linear response compensator, as shown in Fig. 3, comprises a resistor 36 connected to the negative side of the bias battery 15 and a capacitor 37 shunting the battery 15 and the resistor 36. Therefore, the negative potential or bias applied to the grid 19 of the measuring tube 10 upon closing of the relay contacts is the potential of the capacitor 37 rather than that of the battery 15.

As the amount of gamma radiation increases so as to increase the frequency of the indicating oscillator, less time is provided for charging the capacitor 37 and less bias voltage is applied to the grid 19. Consequently, less time is required to raise this voltage to the point where the tube 10 can again conduct. Therefore, the frequency of oscillation and the number of recorded counts in a given period of time is greater than that which would be linearly correlated with the rate of voltage change on the control grid 19 and the non-linearity of response of the ionization chamber 33 can thus be compensated for by the proper selection of the size of resistor 36 and capacitor 37.

Another application of the measuring device of the present invention is shown in Fig. 4 wherein, through slight modification of the circuit arrangement, the device functions as a light intensity meter. The circuit is basically the same as that illustrated in Fig. 2, the modifications being the removal of the indicator relay 20 from the plate circuit of the tube 10 and the insertion of indicator lamps 38 and 39 in the plate circuits, respectively, of the tubes 10 and 27. Additionally, a variable resistor 25' is substituted for the fixed resistor 25 in the grid circuit of the discriminator tube 27.

The anode 41 of a photo-tube 42 is connected to the positive side of a battery 43 while the light-sensitive cathode 44 of the photo-tube is connected to the control grid 19 of the tetrode 10 through the input terminal 22. When so connected, the potential on the control grid 19 will vary with any change in the rate of electron flow from the cathode 44 of the photo-tube 42 and accordingly with a change in the intensity of the light impinging on that cathode. This is so because the grid 19 sees the photo-tube circuit across the terminals 22, 23 as an R-C circuit whose R decreases with increased photo-current.

As previously pointed out, the time constant of the circuits of respective grids 19 and 28 of the two tubes 10 and 27 will determine which of said tubes will conduct to thus control the application of bias voltage to the grids of both tubes 10 and 27. For measuring light, the variable resistor 25' is adjusted so that the discriminator tube 27 will maintain such control (as indicated by flashing of lamp 39) when no light is directed against the light-sensitive cathode 44 of the photo-tube 43, but will lose control if any light rays do fall on said cathode. In this manner, a zero light intensity level or threshold is established and is indicated by the setting of the variable resistor 25'.

When the cathode 44 of the photo-tube is then exposed to the rays emanating from a selected light source, the time constant of the circuit of the grid 19 of the tube 10 will decrease, and this tube will assume control of the application of bias voltage to the grids 19 and 28. Flashing of the lamp 38 indicates that tube 10 is conducting. The variable resistor 25' is now readjusted to decrease the time constant of the R-C circuit of the discriminator tube 27 to a point where this tube regains control of the bias voltage application, which point will be indicated by repeated flashing of the other lamp 39. The precise setting of the resistor 25' at the point of transfer of control from the measuring tube 10 to the discriminator tube 27 is thus directly correlated with the intensity of the light which falls upon the cathode 44 of the photo-tube 43.

It will be apparent that the capacitor 26 in the grid circuit of the discriminator tetrode 27 can be made adjustable rather than the resistor 25, as above described. It is only essential that some means for adjusting the time constant in this grid circuit be provided in order that the invention function as a light-intensity meter in the manner set forth.

Other applications of the measuring device of the present invention will readily occur to those skilled in the art and minor modifications to the measuring circuit, such as the use of triode or pentode tubes rather than tetrodes as specifically described, may be made without departing from the spirit of the invention. It is therefore to be understood that within the scope of the appended claims, the invention may be practiced otherwise than as specifically described.

The invention described herein may be manufactured and used by or for the Government of the United States of America for governmental purposes without the payment of any royalties thereon or therefor.

We claim:

1. An arrangement for indicating the time constant of an electronic circuit comprising first and second electronic tubes, each tube having a cathode, a plate, and a control grid; a plate circuit for each tube including a source of current supply connected in series between the plate and cathode of each tube; a grid circuit for each tube including means for connecting each grid in series with its respective cathode; means to apply a negative potential to the control grids of both of said tubes, said last-named means being actuable in response to the flow of current in the plate circuit of one of said tubes and said last-named means being also actuable with equal effectiveness in response to the flow of current in the plate circuit of the other of said tubes, said potential being of a value sufficient to preclude the flow of current through said tubes; means in the grid circuit of said first tube for establishing a predetermined rate for the potential on the grid of said first tube to diminish, and means for connecting the electronic circuit to the control grid of said second tube whereby its potential diminishes at a rate determined by the time constant of the electronic circuit.

2. Arrangement according to claim 1 comprising means for adjusting the predetermined rate of diminution of potential on the grid of said first tube.

3. Arrangement according to claim 1 wherein said means for establishing a predetermined rate for the potential on the grid of said first tube to diminish comprises a resistor connected to the grid of said first tube and a capacitor shunting said resistor.

References Cited in the file of this patent

UNITED STATES PATENTS

| | | |
|---|---|---|
| 2,350,888 | Hall | June 6, 1944 |
| 2,442,238 | Haungs | May 25, 1948 |
| 2,532,508 | Menkhaus | Dec. 5, 1950 |
| 2,542,264 | Smith | Feb. 20, 1951 |
| 2,583,792 | Nelson | Jan. 29, 1952 |